United States Patent
Hreha et al.

(10) Patent No.: US 10,752,339 B2
(45) Date of Patent: Aug. 25, 2020

(54) CUSTOMIZING AIRCRAFT PERFORMANCE SYSTEMS AND METHODS

(71) Applicant: The Boeing Company, Chicago, IL (US)

(72) Inventors: Mark Hreha, Alton, IL (US); John Bolling, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 982 days.

(21) Appl. No.: 15/074,942

(22) Filed: Mar. 18, 2016

(65) Prior Publication Data
US 2017/0267330 A1   Sep. 21, 2017

(51) Int. Cl.
*G01C 23/00* (2006.01)
*B64C 13/04* (2006.01)
*B64C 13/18* (2006.01)
*B64C 13/06* (2006.01)

(52) U.S. Cl.
CPC ........ *B64C 13/0421* (2018.01); *B64C 13/044* (2018.01); *B64C 13/06* (2013.01); *B64C 13/18* (2013.01)

(58) Field of Classification Search
CPC ................................. B64C 13/06; B64C 13/18
USPC ....... 701/3, 4, 11, 400, 8, 14, 425; 244/75.1, 244/76 R, 220, 221
See application file for complete search history.

(56) References Cited

U.S. PATENT DOCUMENTS

| | | | |
|---|---|---|---|
| 2005/0004721 A1* | 1/2005 | Einthoven ............ | G05D 1/0858 701/4 |
| 2007/0221782 A1* | 9/2007 | Cerchie ................... | B64C 13/22 244/75.1 |
| 2008/0237392 A1* | 10/2008 | Piasecki .................. | B64C 27/26 244/6 |
| 2008/0308682 A1* | 12/2008 | Builta .................... | B64D 31/08 244/182 |
| 2009/0048722 A1* | 2/2009 | Piasecki .................. | B64C 27/26 701/3 |
| 2009/0062973 A1* | 3/2009 | Caldeira .............. | G05D 1/0833 701/6 |
| 2009/0152404 A1* | 6/2009 | Yount ................... | B64C 13/505 244/194 |
| 2011/0024551 A1* | 2/2011 | Biest ..................... | B64C 13/345 244/6 |
| 2011/0315806 A1* | 12/2011 | Piasecki .................. | B64C 27/32 244/2 |
| 2012/0290153 A1* | 11/2012 | Olsoe .................... | B64C 13/505 701/3 |

(Continued)

Primary Examiner — Khoi H Tran
Assistant Examiner — B M M Hannan
(74) Attorney, Agent, or Firm — Haynes and Boone, LLP

(57) ABSTRACT

Systems and methods are described for changing the performance of an aircraft by customizing aircraft control system parameters based on a subjective personal preference of a pilot. The system includes a user interface for receiving the customized aircraft control system parameters from the pilot. A first aircraft control module may receive the customized aircraft control system parameters from the user interface, and also receive flight control commands from the pilot. The received flight control commands and the received customized aircraft control system parameters may be processed by the first aircraft control module to cause the aircraft to perform according to customized characteristics as determined by the pilot.

20 Claims, 4 Drawing Sheets

(56) References Cited

U.S. PATENT DOCUMENTS

2017/0217584 A1\* 8/2017 Elfeky ................ B64C 29/0033

\* cited by examiner

CUSTOMIZING AIRCRAFT PERFORMANCE SYSTEMS AND METHODS

FIELD

The present application relates to flight control systems for aircraft. More particularly, one or more embodiments relate to systems and methods for customizing aircraft performance.

BACKGROUND

Development of flight control systems for manned air vehicles (e.g., commercial transport aircraft, military transport aircraft, tactical aircraft, general aviation aircraft) involve determining specific flying characteristics acceptable to pilots that will fly the aircraft. Numerous design specifications exist in an attempt to quantify what are considered "desirable" flying characteristics and thousands of hours are spent typically in manned simulations and costly flight test evaluations to fine tune the specifications of new aircraft designs. Results of these extensive development efforts are flying characteristics that are universally accepted but often not individually preferred by test pilots.

SUMMARY

According to an aspect of an embodiment of the present disclosure, an aircraft control system, includes a user interface configured to receive customized aircraft control system parameters from a pilot, and a first aircraft control module. The first aircraft control module may be configured to receive the customized aircraft control system parameters from the user interface, and receive flight control commands from the pilot, where the received flight control commands and the received customized aircraft control system parameters are processed by the first aircraft control module to cause the aircraft to perform according to customized characteristics determined by the pilot.

According to another aspect of an embodiment of the present disclosure, a method for customizing aircraft characteristics by a pilot is described. The method may include receiving by a user interface, customized aircraft control system parameters from the pilot, and receiving the customized aircraft control system parameters from the user interface by a first aircraft control module. The method also includes receiving flight control commands from the pilot, where the received flight control commands and the received customized aircraft control system parameters are processed by the first aircraft control module to cause the aircraft to perform according to customized characteristics determined by the pilot.

According to yet another aspect of an embodiment of the present disclosure, the customized aircraft control system parameters from the pilot include subjective preferences of the pilot, and the subjective preferences are adapted to achieve the pilot's desired flight performance by the aircraft.

Figure 1:
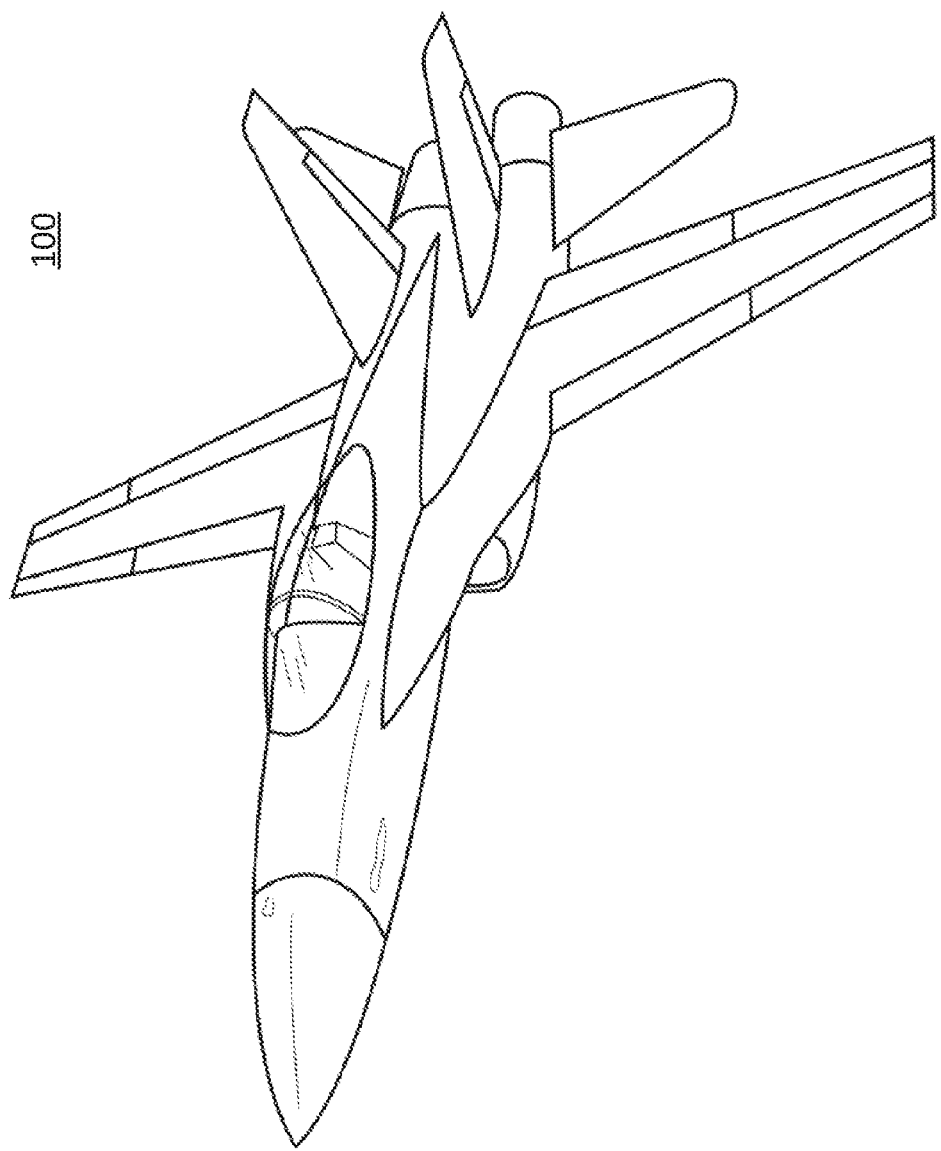
FIG. 1 is an exemplary aircraft that may include a flight control system according to an embodiment of the present disclosure.

Embodiments of the present disclosure are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. In the drawings, the relative sizes of elements, layers, and regions may be exaggerated for clarity.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Subjective judgments by individual pilots provide control inceptor feel and sensitivity, and dynamic characteristics such as damping, command overshoot, and steady state settling responses. Aggregate test teams assess flight performance based on previous limited experiences with older aircraft. Once the flight control system design is complete, succeeding generations of future pilots are left to conform their skills to the designed flying characteristics that are embedded to the flight control system.

Once flying parameters for existing flight control systems are tested and certified for a specific aircraft, they cannot be altered without undergoing substantial investment in simulation, flight test, and re-certification, even as technologies advance over the aircraft's lifetime. Existing design philosophies use "ideal" aerodynamic models for simulations and "factory-fresh" test aircraft to tune control characteristics. They do not account for airframe-to-airframe variations between aircraft of the same model that result due to production deviations and manufacturing tolerances. As future pilots now hone their hand-eye coordination, situation awareness, and reaction speed using advanced computer-based simulations, individual pilot capabilities can be expected to exceed those of established flight test schools at increasing rates. "One-size fits all" control systems stifle the pilots' creativity to fully maximize the capabilities of a particular aircraft and curtail its useful lifetime. Thus, flight control systems that are customizable by the individual pilots can help the pilot achieve aircraft performance that they are looking for.

Aircraft control systems provide flight parameters to the aircraft based on a plurality of inputs and/or embedded settings (e.g., embedded when manufactured), which ultimately cause the aircraft to perform in a certain manner during a flight. For example, a control system can affect the sensitivity of the control stick or rudder pedals. In autopilot modes, the control system can affect response for heading and/or altitude hold commands, and/or affect the roll/pitch rates or bank/pitch angles based on the programming of the control system. In existing systems, such parameters are embedded into the control system, e.g., when the aircraft was manufactured. However, by allowing a pilot to change these parameters, the pilot is able to customize the performance of the aircraft based on his personal preference and/or based on the objective/mission of the flight. It is further noted that the pilot's preference is a personal subjective preference that may vary from one pilot to another. In other words, one pilot's preferences for the aircraft's performance may be different from another's pilot's preference for the aircraft's performance even if the objective/mission of the flight and the aircraft are the same. For example, one pilot may prefer to adjust parameters A, B, and C to achieve the smoothest flight, whereas another pilot may prefer to adjust parameters A, C, and E to achieve the smoothest flight. Thus, the pilots' preferences are subjective and personal.

According to various embodiments of the present disclosure, techniques are described that enable pilots to customize aircraft performance which allows the pilots to apply their innate abilities and skills, decrease training efforts, costs, and schedule, improve fatigue-causing workload, and extend aircraft service life by mitigating outmoded flying qualities.

Accordingly, providing pilots with the ability to customize an aircraft's control system parameters for the control system allows the pilot to fully maximize the performance capabilities of the aircraft. For example, an aircraft may be used to transport injured or ill personnel (e.g., medevac) from one location to another. For such medevac missions, it may be desirable to fly the aircraft as smoothly as possible by reducing turbulence, vibrations, and/or other aggressive/harsh maneuvers (e.g., steep banks with heavy G-load) that may affect the injured or ill passenger. On the other hand, in the case of a tactical military aircraft 100 as shown, by way of example, in FIG. 1, the pilot may want the aircraft to perform in a different manner based on whether they are flying a combat scenario (e.g., executing air-to-air or air-to-ground combat maneuvers) or whether they are simply making a long transit flight (e.g., cruising cross-country) from one location to another, without an expectation of facing a combat scenario. That is, for example, if the pilot expects to fly in a combat scenario, the pilot may want to increase the sensitivity of the cockpit inceptors for flight control commands (e.g., control stick, rudder pedals to pitch, bank, or yaw) so that they can quickly maneuver the aircraft against enemy threats. However, the consequences may be a rougher ride, which may be less important in a combat scenario. On the other hand, during a transit flight, the pilot may not want the aircraft to respond to minor inputs from the cockpit inceptors (e.g., the pilot inadvertently bumping the control stick). Instead, fuel efficiency may be more important for such flights. In a further example, the pilot may be concerned about personal comfort to reduce fatigue from sitting in a small cockpit during a long duration flight. Thus, the sensitivity of the cockpit inceptors may be customized between light touch and heavy touch, or low sensitivity and high sensitivity. Accordingly, the control system parameters may be customized by the pilot in order to achieve a performance from the aircraft as determined by the pilot.

In other embodiments, dynamic responses of the aircraft may be customized by the pilot. Example dynamic control system parameters may include, but are not necessarily limited to, command overshoot, dynamic damping, speed of response, and settling time.

In some embodiments, the pilot may customize the control system parameters through various phases of a flight. For example, smooth ride characteristics with lower control precision may be desired during a cruising portion of the flight to reduce fatigue, while heightened control precision may be desired for landing approaches at congested airfields. Yet in some embodiments, the pilot may customize the control system parameters based on atmospheric conditions as they fly through different weather conditions.

In some embodiments, one or more of the control system parameters may be grouped together as one or more sets of control system parameters. Thus, the control system parameters may be changed together as a group. For example, one group of parameters may include the control system parameters that allow the aircraft to fly more smoothly. Instead of the pilot adjusting each of the individual parameters that affect the smoothness of the flight, the group parameter may adjust all of the parameters together. For example, dynamic parameters that affect the aircraft response such as frequency and damping may typically be grouped together to adjust the perceived smoothness of the aircraft to turbulent conditions. In one extreme the grouped parameters result in an aircraft response that is less precise but smoother in response to atmospheric turbulence. On the other extreme these same group of parameters with different settings could result in an aircraft that is extremely precise to pilot commands but could be experienced by the pilot as too bumpy in turbulent atmospheric conditions.

In yet a further embodiment, the parameters may be grouped together such that the aircraft performs like a different type of aircraft when the group of parameters is changed. In other words, the aircraft may be configured to simulate the flying characteristics of another type of aircraft. For example, military pilots may utilize a trainer aircraft (e.g., T-45 Goshawk) to learn the basic skills of flying a jet aircraft before transitioning to fly a more advanced aircraft (e.g., F/A-18 Hornet). However, before the pilot transitions to the more advanced aircraft, the pilot may program the trainer aircraft to respond and perform like the advanced aircraft instead of the trainer aircraft. Thus, a plurality of control system parameters are grouped together to form a set of parameters, and each group of control system parameters may be set to have certain settings such that each group of control system parameter settings correspond to the behavior of a different type of aircraft. For example, a first group setting may cause the aircraft to behave like an F/A-18, whereas a second group setting may cause the aircraft to behave like an F-16, and so on. While the above example describes a scenario for a military trainer aircraft, a similar scenario may be applicable to a commercial airline pilot who may be flying one type of aircraft (e.g., Boeing 777) but desires to simulate the performance of another aircraft (e.g., Boeing 787). In this case, the pilot may simply enable the group of parameters that would change the characteristics of the Boeing 777 to mimic those on the Boeing 787.

In some embodiments, the pilot may have a user interface console at the cockpit of the aircraft where he is able to enter his customized control system preferences either before or during the flight.

Figure 2:
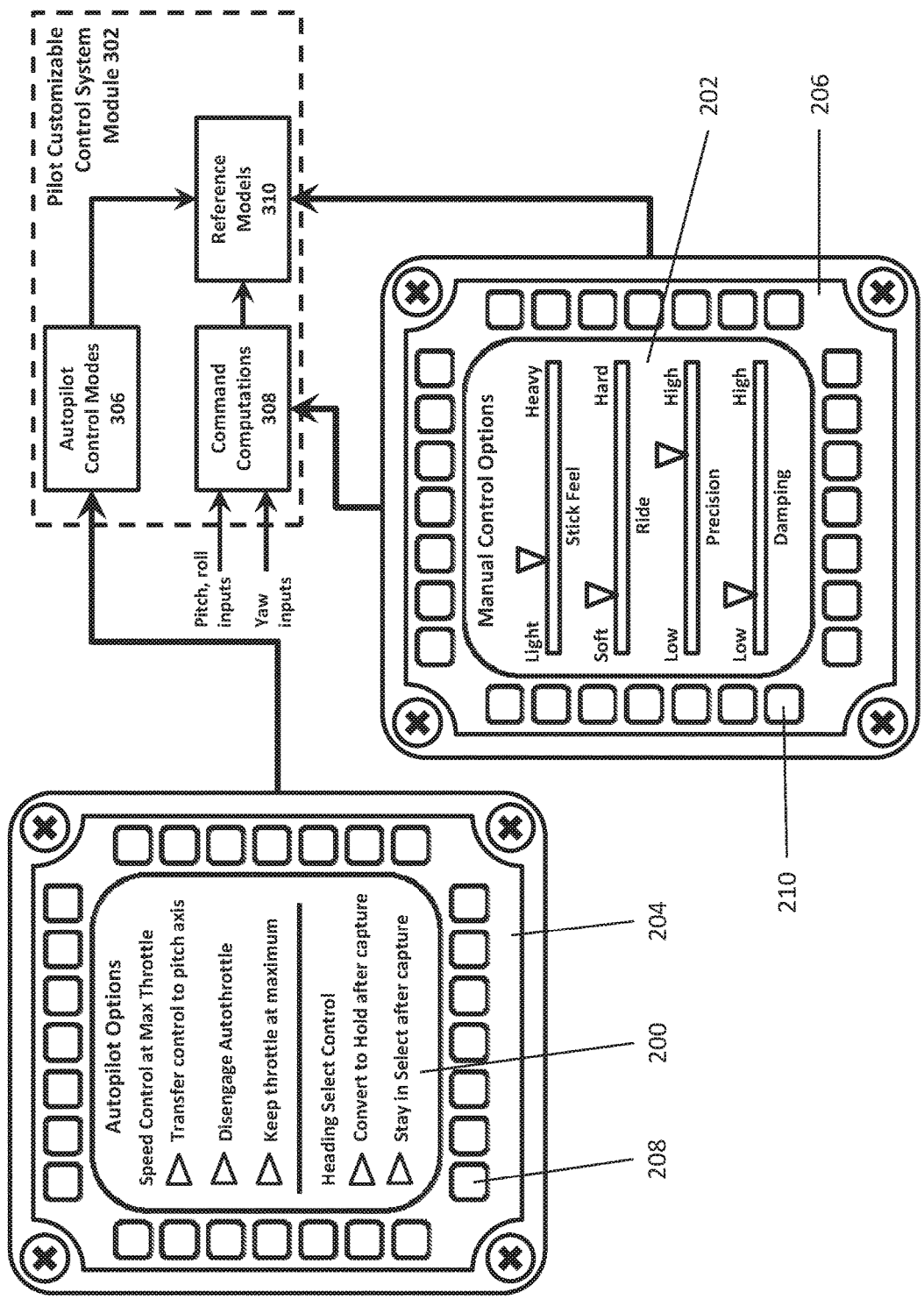
FIG. 2 illustrates an exemplary user interface used for entering a pilot's customized parameters to the flight control system according to an embodiment of the present disclosure.

FIG. 2 show an exemplary user interface for entering a pilot's customized parameters to the flight control system in accordance with an embodiment of the present disclosure. In some embodiments, the user interface may be a display 200, 202 (e.g., a touch screen display) that is mounted on a console in the cockpit of the aircraft. As illustrated in FIG. 2, display 200 shows the customizable control system parameters that relate to the autopilot feature, and is mounted on console 204. In some embodiments, the console 204 has a plurality of buttons 208 that correspond to the parameters shown on the display 200, which allows the pilot to enter his autopilot control system parameter selections. For example, the pilot may have three customizable options when in the autopilot mode and the speed control levers are at the maximum throttle position. Here, the pilot is able to choose from, 1) transfer control to pitch axis, 2) disengage auto-throttle, or 3) keep throttle at maximum. According to another example in the autopilot mode, the pilot has two customizable options for the heading select control. Here, the pilot is able to choose from, 1) convert to hold after capture, or 2) stay in select after capture. The pilot selected options are then provided to the pilot customizable control system module 302 where it is processed.

In some embodiments, the pilot customizable control system module 302 includes an autopilot control modes module 306, a command computations module 308, and a reference models module 310. The customizable control options relating to the autopilot feature are provided to the autopilot control modes module 306. This operation will be described in more detail later.

According to another embodiment, display 202 shows customizable control system parameter options when in manual flight control mode, and the display 202 is mounted on console 206. In some embodiments, the console has a plurality of buttons 210 that correspond to the parameters shown on the display 202, which allows the pilot to enter his selections for the corresponding manual flight control system parameters. In this example display 202, the manual flight control system parameters include, stick feel, ride, precision, and damping. Here, the pilot is able to select a range of values for each of the stick feel, ride, precision, and damping parameters by sliding the arrow on the scale to the left or to the right using the buttons 210, or if the display 202 is a touch screen display, by performing a touch gesture directly on the touch screen display. The pilot selected control system parameters are then provided to the command computations module 308 or the reference models module 310 of the pilot customizable control option module 302 where it is processed. This operation will be described in more detail later.

In some embodiments, the pilot customized control system parameters may be saved so that the pilot can easily customize his aircraft without having to adjust each parameter before every flight. In more detail, the pilot customizable control system may have a memory where the pilot creates a user account. Every time the pilot flies the particular aircraft, the pilot would log-in to his user account so that the pilot can either retrieve any saved flight control system parameter settings, or so that the pilot can store any new/updated flight control system parameter settings. For example, when the pilot flies the aircraft for a medevac mission, the pilot has a set of parameters which he previously determined are optimal for this specific mission. Instead of manually setting the parameters each time this pilot flies a medevac mission on this aircraft, the pilot can simply log-in to this account (e.g., by entering his username and password) and select the medevac parameters from his list of saved control system parameter settings, and he would be ready to fly. In some embodiments, each set of saved control system parameters may be assigned a code and the pilot can simply type in the code to restore his previously stored control system parameters. In yet another trainer application, pilot instructors may save groups of parameters together and name those sets according to the production aircraft which they mimic. In such cases the student pilots can recall the specific set of parameters according to the aircraft that they are training to fly (e.g., "F/A-18", "F-16", etc.).

Figure 3:
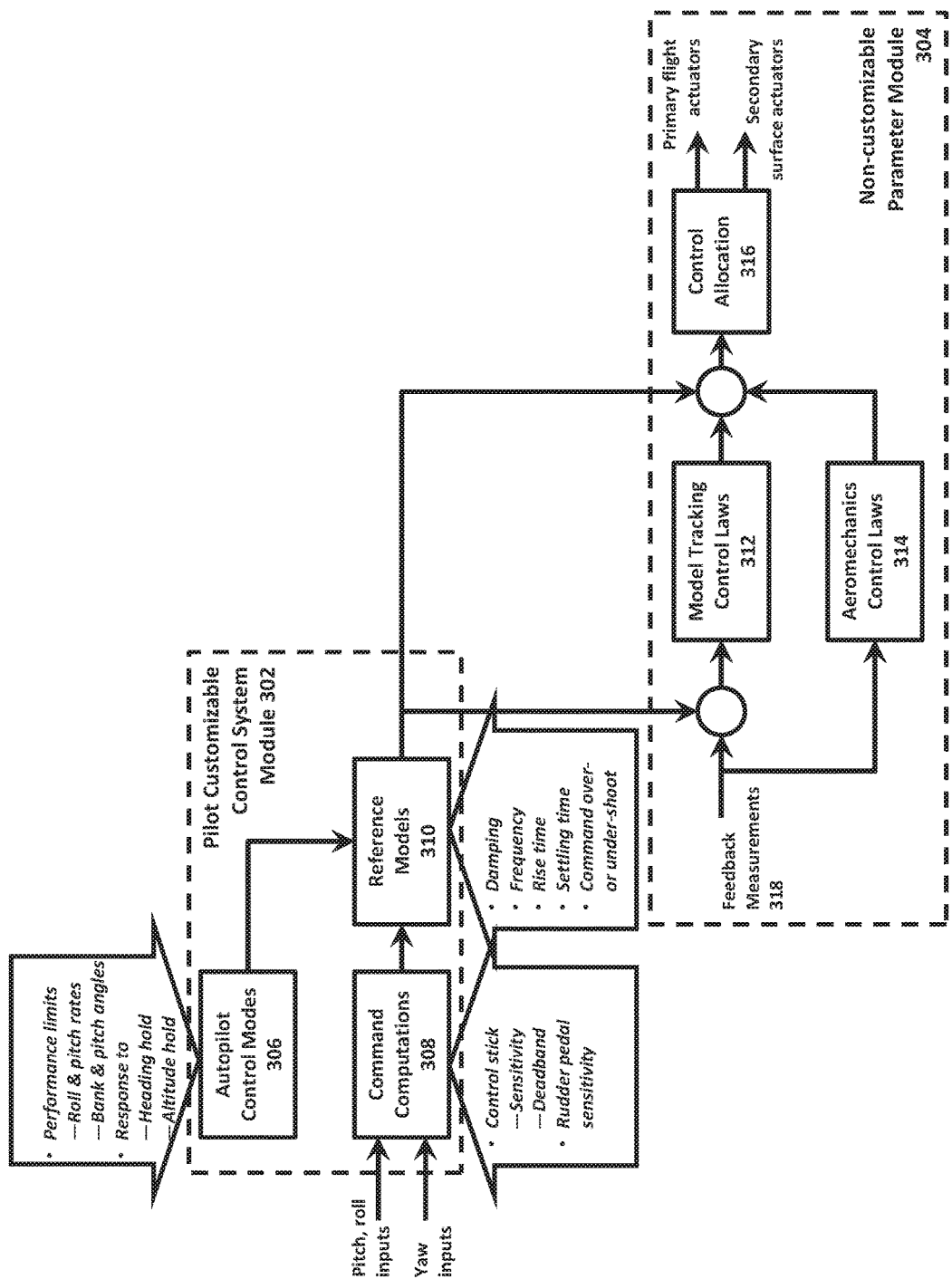
FIG. 3 is an exemplary block diagram of the flight control system according to an embodiment of the present disclosure.

FIG. 3 is an exemplary block diagram of a flight control system according to an embodiment of the present disclosure. The flight control system can be separated into a pilot customizable control system parameter module 302 and a non-customizable control system parameter module 304. In accordance with the above described embodiments, the customizable control system parameters relate to flight command input shaping and desired reference model dynamics, which the aircraft will mimic. The non-customizable control system parameters relate to parameters that correspond to flight safety and controllability assurance. Thus, it is not desirable for the pilots to have the ability to customize flight safety related parameters. However, while certain parameters may be grouped as being customizable control system parameters and other parameters may be grouped as non-customizable control system parameters herein the present disclosure, the grouping of the parameters are not limited thereto. For example, one person skilled in the art may consider that certain parameters are related to flight safety while at the same time, another person skilled in the art may consider that those same parameters are not related to flight safety and may instead be grouped as customizable control system parameters.

Referring back to FIG. 3, according to an embodiment, the pilot customizable control system parameters 302 are combined with the non-customizable control system parameters 304, and the resulting combined control signal is provided to the flight actuators.

The pilot customizable control system module 302 includes parameters that are provided by the pilot to the autopilot controls module 306, command computations module 308, and reference models module 310. By way of example and not of limitation, the parameters that are provided to the autopilot control modes module 306 include performance limits such as roll/pitch rate limits, and bank/pitch angle limits. That is, in the autopilot mode, a limit can be set such that the aircraft will not roll at a rate that is greater than the customized roll rate limit. Similarly, a limit can be set such that the pitch of the aircraft will not change any greater than the customized pitch rate limit. Furthermore, a limit can be set such that the aircraft will not bank or pitch to an angle greater than the customized bank and pitch angle limits.

In some embodiments, the autopilot control modes module 306 includes parameters associated with heading and/or altitude orders. For example, the pilot can customize how he wants the aircraft to respond when he issues a heading hold command (directional hold) or an altitude hold command (longitudinal hold) to the autopilot. For example, in response to an altitude hold command according to a first option, the aircraft may attempt to level out at the ordered altitude. Thus, if the aircraft overshot the ordered altitude due to excess climb energy when the hold command was initiated, the aircraft will descend to the altitude of the hold command and hold that altitude (e.g., correcting for the overshoot). In response to an altitude hold command according to a second option, if the aircraft exceeded the altitude of the hold command, the aircraft would simply level off as soon as possible without descending. Thus, the aircraft may level off and hold at an altitude that is higher than when the altitude hold command was engaged. While not all possible autopilot parameters are listed herein, a person skilled in the art would appreciate that other autopilot related parameters may be provided to the autopilot control modes module 306.

In some embodiments, in response to a heading hold command, the aircraft may return to the precise heading when the hold command was engaged, thus correcting for the overshoot. According to another option, the aircraft may hold the existing heading achieved when the aircraft rolled out to wings level.

In some embodiments, the command computations module 308 includes inputs from the cockpit inceptors (i.e., flight control commands from control stick regarding the pitch and roll of the aircraft, and inputs from the rudder pedals regarding the yaw of the aircraft). By way of example and not of limitation, the pilot customized control system parameters that are provided to the command computations module 308 include parameters such as sensitivity and deadband of the control stick, and sensitivity of the rudder pedals. That is, the flight control command inputs and the customized parameter settings that are related to the flight control commands are provided to the command computations module 308 so that the control system can process the flight control commands based on the pilot's custom settings for the particular control system parameter, which are ultimately processed by the model tracking control laws module 312 at the non-customizable parameter module 304. In more detail, a typical command computations module will convert the sensed cockpit inceptor (e.g., pitch/roll stick and rudder pedal) displacements or forces into aircraft performance parameters that are processed by the non-customizable model tracking control laws module 312. For example, the pitch stick displacement or force is shaped according to the pilot's customizable sensitivity/deadband parameters and converted to a desired load factor, angle of attack, or pitch rate command, which in turn affects the rate at which an aircraft can turn, climb, or in combat scenarios, acquire a target.

By way of example and not of limitation, the parameters that are provided to the reference models module 310 include references for damping, frequency, rise time, settling time, command overshoot, and command undershoot. Furthermore, an output signal from the autopilot control modes module 306 and the command computations module 308 are both provided to the reference models module 310, in accordance with an embodiment of the present disclosure. Here, at the reference models module 310, the signals from the autopilot control modes module 306 and the command computations module 308 are processed together with the pilot customized control system parameters for the reference models, and a pilot customized control signal is outputted from the pilot customizable control system module 302, and provided to the non-customizable parameter module 304.

According to an embodiment, the non-customizable parameter module 304 includes parameters that are not designed to be modified or customized by the pilot because they are related to flight safety and controllability assurance. Thus, it is not desirable to give the pilot the ability to modify safety related parameters of an aircraft because modifying such parameters without undergoing extensive research and evaluation with the modified parameters could prove to be dangerous for flight operations. As illustrated in FIG. 3, the non-customizable parameter module 304 includes a model tracking control law module 312, an aeromechanics control law module 314, and a control allocation module 316, none of which can be directly modified by the pilot. In some embodiments, feedback measurements 318 are provided to the non-customizable control parameter module 304, which is processed with the non-customizable parameters. The processed pilot customized control system parameters from the pilot customizable control module 302 and the non-customizable parameters from the non-customizable parameters module 304 are provided to primary flight actuators 320 and secondary surface actuators 322.

Figure 4:
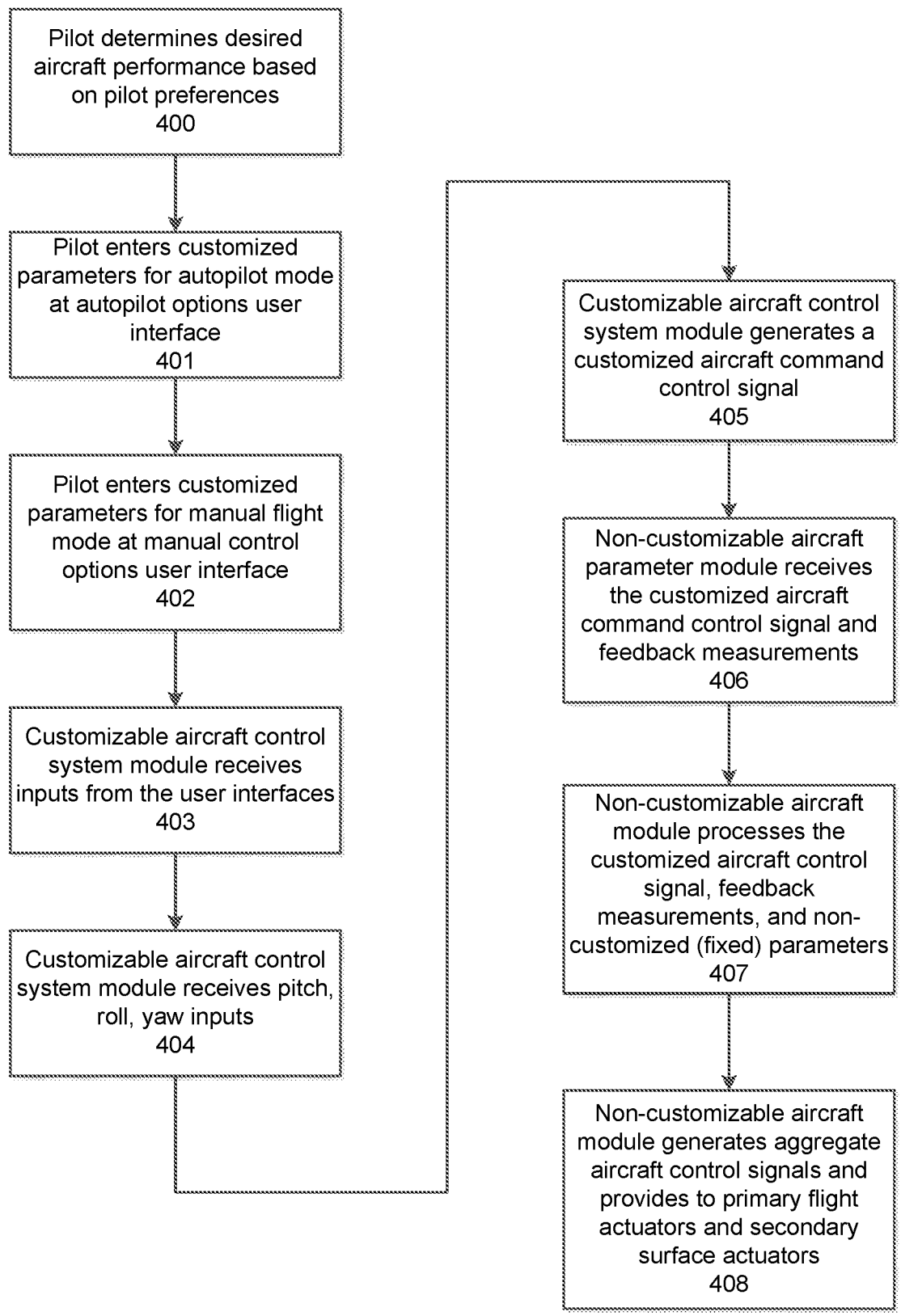
FIG. 4 is an exemplary flow chart for describing the operations for customizing an aircraft performance in accordance with one or more embodiments.

FIG. 4 is an exemplary flow chart for describing operations performed in customizing an aircraft's performance. At block (400), a pilot first determines the type of performance he desires from the aircraft during a flight based on the objective of the flight and the particular aircraft type and/or model. Based on the pilot's preference or the objectives of the flight, the pilot enters customized control system parameters at a user interface console located, for example, in the cockpit of the aircraft. If the pilot intends to use the autopilot feature of the aircraft, the pilot may enter his customized autopilot mode parameters into the autopilot options user interface (401). If the pilot's desired performance includes customizing the various manual control parameters, the pilot may enter his customized manual flight mode parameters in the manual control options user interface (402). If the pilot does not enter any custom parameters, default (e.g., generally acceptable) values are used. Once the pilot enters his custom parameters at the user interface, the parameter information is received by the customizable aircraft control system module (403). In addition to receiving the parameter information from the user interface, the customizable aircraft control module also receives flight control commands, such as pitch, roll, and yaw inputs from the cockpit inceptor (404). Based on the custom parameter information entered by the pilot and the flight control commands, the customizable control system module generates a customized control signal (405) and provides this signal to a non-customizable parameter module. The non-customizable parameter module also receives feedback measurements (406) and processes the customized control signal, the feedback measurements, and the non-customized (fixed) parameters (407) to generate an aggregate aircraft control signal. The aggregate aircraft control signal is provided to primary flight actuators and secondary surface actuators (408).

In some embodiments, the user interface and the flight control system module may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed above. The hardware processor may also be implemented as a combination of computing devices, e.g., a combination of a DSP and a microprocessor, a plurality of microprocessors, one or more microprocessors in conjunction with a DSP core, or any other such configuration. The hardware processor may be a single processor or multiple processors, where each processor may have one or more processing cores capable of parallel and/or sequential operation.

The non-transitory memory may include a cache memory (e.g., a cache memory of the processor), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the non-transitory memory includes a non-transitory computer-readable medium.

The non-transitory memory may store instructions that, when executed by the hardware processor, cause the hardware processor or a system that includes the hardware processor to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements. In some embodiments, the memory may include an operating system, such as LINUX® or other custom operating systems. Yet in some embodiments, the non-transitory memory may include a database for storing information (e.g., name, identification number, etc.) for user profiles.

Logic may be encoded in a computer readable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component, volatile media includes dynamic memory, such as the system memory component, and transmission media includes coaxial cables, copper wire, and fiber optics, including wires that comprise the bus.

It will be understood that, although the terms "first," "second," "third," etc., may be used herein to describe various elements, regions, and/or sections, these elements, regions, and/or sections should not be limited by these terms. These terms are used to distinguish one element, region, or section from another element, region, or section. Thus, a first element, region, or section described below could be termed a second element, region, or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in faun and detail without departing from the scope of the present disclosure. Thus, the present disclosure is limited only by the claims and their equivalents.

The invention claimed is:

1. An aircraft control system, comprising:
a user interface configured to receive customized aircraft control system parameters from a pilot; and
a first aircraft control module configured to:
receive the customized aircraft control system parameters from the user interface; and
receive flight control commands from the pilot, wherein the received flight control commands and the received customized aircraft control system parameters are processed by the first aircraft control module to cause an aircraft to perform according to customized characteristics determined by the pilot, wherein at least one of the flight control commands is received from the pilot via an inceptor, wherein at least one of the customized aircraft control system parameters is associated with a sensitivity of the inceptor, wherein an input from the inceptor when the inceptor is at a first sensitivity is associated with a first value for the at least one of the customized aircraft control system parameters, wherein the same input from the inceptor when the inceptor is at a second sensitivity different from the first sensitivity is associated with a second value for the at least one of the customized aircraft control system parameters, and wherein the first value is different from the second value.

2. The system of claim 1, wherein the user interface comprises an autopilot customization user interface and a manual flight customization user interface, the autopilot customization user interface being configured to receive customized autopilot performance parameters from the pilot and the manual flight customization user interface being configured to receive manual flight performance parameters from the pilot.

3. The system of claim 2, wherein the first aircraft control module comprises:
an autopilot control module configured to receive the customized autopilot performance parameters from the autopilot customization user interface;

a command computation module configured to receive customized flight command control system parameters from the manual flight customization user interface; and a reference model module configured to receive customized dynamic response parameters from the manual flight customization user interface.

4. The system of claim 2, wherein the customized autopilot performance parameters comprise performance limits and responses to commands, and the manual flight performance parameters comprise response to flight control commands provided from the pilot.

5. The system of claim 2, wherein the customized autopilot performance parameters comprise one or more parameters selected from a first group consisting of: roll and pitch rate limits, bank and pitch angle limits, response to directional control modes, response to speed control modes, and response to longitudinal control modes, and wherein the manual flight performance parameters comprise one or more parameters selected from a second group consisting of: control stick sensitivity, control stick deadband, rudder pedal sensitivity, damping, frequency, rise time, settling time, command overshoot, and command undershoot.

6. The system of claim 2, further comprising a memory configured to store a first pilot profile and a second pilot profile, wherein each of the first and second pilot profiles comprise customized autopilot performance parameters and manual flight performance parameters associated with a first pilot and a second pilot, respectively, wherein the flight control commands comprise pitch, roll, and yaw inputs, and wherein at least one of the customized aircraft control system parameters is associated with a deadband of the inceptor.

7. The system of claim 1, further comprising a memory configured to store a first set of customized aircraft control system parameters, wherein:
the aircraft is a first type of a training aircraft configurable to simulate flight characteristics of a plurality of different aircraft types;
the first set of customized aircraft control system parameters corresponds to a second type of aircraft different from the first type; and
the first set of customized aircraft control system parameters comprises instructions to limit a performance characteristic of the training aircraft to simulate a corresponding performance characteristic of the second type of aircraft.

8. The system of claim 7, wherein the first aircraft control module comprises a pilot customizable control module and a non-customizable parameter module, wherein:
the pilot customizable control module comprises one or both of aircraft performance limits and cockpit inceptor sensitivity;
the non-customizable parameter module comprises flight safety and controllability data;
the pilot customizable control module is configured to receive pilot inputs;
the non-customizable parameter module is configured to receive feedback measurements from one or more systems of the aircraft and process the feedback measurements based on the flight safety and controllability data to determine processed data; and
the first aircraft control module is configured to receive the pilot inputs and the processed data to determine instruction data to one or more flight system actuators of the aircraft.

9. The system of claim 7, wherein each of the plurality of different aircraft type corresponds to a make and model, wherein the instructions comprise instructions to cause the training aircraft to simulate flying characteristics of an aircraft of a corresponding make and model, and wherein the memory is further configured to store a second set of customized aircraft control system parameters corresponding to a third type of aircraft different from the first type and the second type.

10. The system of claim 1, further comprising a second aircraft control module configured to process non-pilot customizable aircraft parameters and the customized aircraft control system parameters to generate flight control signals to the aircraft, wherein the customized aircraft control system parameters from the pilot comprise subjective preferences of the pilot, the subjective preferences adaptable to achieve a desired flight performance by the aircraft.

11. The aircraft control system of claim 1, wherein the input comprises a displacement of the inceptor or a force on the inceptor.

12. The aircraft control system of claim 1, wherein the inceptor comprises a control stick or a rudder pedal.

13. A method for customizing aircraft characteristics by a pilot, the method comprising:
receiving by a user interface, customized aircraft control system parameters from the pilot; and
receiving by a first aircraft control module:
the customized aircraft control system parameters from the user interface; and
flight control commands from the pilot, wherein the received flight control commands and the received customized aircraft control system parameters are processed by the first aircraft control module to cause an aircraft to perform according to customized characteristics determined by the pilot, wherein at least one of the flight control commands is received from the pilot via an inceptor, and wherein at least one of the customized aircraft control system parameters is associated with a sensitivity of the inceptor, wherein an input from the inceptor when the inceptor is at a first sensitivity is associated with a first value for the at least one of the customized aircraft control system parameters, wherein the same input from the inceptor when the inceptor is at a second sensitivity different from the first sensitivity is associated with a second value for the at least one of the customized aircraft control system parameters, and wherein the first value is different from the second value.

14. The method of claim 13, wherein the user interface comprises an autopilot customization user interface and a manual flight customization user interface, the autopilot customization user interface being configured to receive customized autopilot performance parameters from the pilot and the manual flight customization user interface being configured to receive manual flight performance parameters from the pilot, and wherein the flight control commands comprise pitch, roll, and yaw inputs.

15. The method of claim 14, wherein the first aircraft control module comprises:
an autopilot control module configured to receive the customized autopilot performance parameters from the autopilot customization user interface;
a command computation module configured to receive customized flight command control system parameters from the manual flight customization user interface; and a reference model module configured to receive customized dynamic response parameters from the manual flight customization user interface, wherein the customized autopilot performance parameters comprise performance limits and responses to commands, and wherein the manual flight performance parameters comprise response to flight control commands provided from the pilot.

16. The method of claim 14, wherein the customized autopilot performance parameters comprise one or more parameters selected from a first group consisting of: roll and pitch rate limits, bank and pitch angle limits, response to directional control modes, response to speed control modes, and response to longitudinal control modes, and wherein the manual flight performance parameters comprise one or more parameters selected from a second group consisting of: control stick sensitivity, control stick deadband, rudder pedal sensitivity, damping, frequency, rise time, settling time, command overshoot, and command undershoot.

17. The method of claim 14, further comprising storing a first pilot profile and a second pilot profile, wherein each of the first and second pilot profiles comprise customized autopilot performance parameters and manual flight performance parameters associated with a first pilot and a second pilot, respectively.

18. The method of claim 13, further comprising storing a first set of customized aircraft control system parameters and a second set of customized aircraft control system parameters, wherein:

the aircraft is a first type of a training aircraft configurable to simulate flight characteristics of a plurality of different aircraft types:

the first set of customized aircraft control system parameters corresponds to a second type of aircraft different from the first type;

the second set of customized aircraft control system parameters corresponds to a third type of aircraft different from the first type and the second type;

the first set of customized aircraft control system parameters comprises instructions to limit a performance characteristic of the training aircraft to simulate a corresponding performance characteristic of the second type of aircraft; and the second set of customized aircraft control system parameters comprises instructions to limit a performance characteristic of the training aircraft to simulate a corresponding performance characteristic of the third type of aircraft.

19. The method of claim 18, wherein the first aircraft control module comprises a pilot customizable control module and a non-customizable parameter module, wherein the pilot customizable control module comprises one or both of aircraft performance limits and cockpit inceptor sensitivity and the non-customizable parameter module comprises flight safety and controllability data, and wherein the method further comprises:

receiving pilot inputs via the pilot customizable control module;

receiving feedback measurements from one or more systems of the aircraft via the non-customizable parameter module;

processing the feedback measurements based on the flight safety and controllability data to determine processed data; and determining instruction data to one or more flight system actuators of the aircraft based on the pilot inputs and the processed data.

20. The method of claim 13, further comprising processing non-pilot customizable aircraft parameters and the customized aircraft control system parameters to generate flight control signals to the aircraft, wherein the customized aircraft control system parameters from the pilot comprise subjective preferences of the pilot, the subjective preferences adaptable to achieve a desired flight performance by the aircraft.

* * * * *